United States Patent
Keefer

(10) Patent No.: US 6,840,985 B2
(45) Date of Patent: Jan. 11, 2005

(54) SURGE ABSORBER FLOW REGULATION FOR MODULAR PRESSURE SWING ADSORPTION

(75) Inventor: Bowie G. Keefer, Vancouver (CA)

(73) Assignee: QuestAir Technologies Inc., Burnaby (CA)

( * ) Notice: Subject to any disclaimer, the term of this patent is extended or adjusted under 35 U.S.C. 154(b) by 7 days.

(21) Appl. No.: 09/998,777

(22) Filed: Dec. 3, 2001

(65) Prior Publication Data

US 2002/0056375 A1 May 16, 2002

Related U.S. Application Data

(63) Continuation of application No. PCT/CA00/00732, filed on Jun. 12, 2000.

(30) Foreign Application Priority Data

Jun. 10, 1999 (CA) .............................................. 2274388

(51) Int. Cl.[7] .......................................... B01D 53/047
(52) U.S. Cl. .......................................... 96/125; 96/130
(58) Field of Search ........................... 96/116, 124, 125, 96/130; 95/113; 55/467

(56) References Cited

U.S. PATENT DOCUMENTS

| | | | | | |
|---|---|---|---|---|---|
| 3,176,446 A | * | 4/1965 | Sigellin | ..................... | 96/118 |
| 3,757,492 A | | 9/1973 | Graff | ............................. | 55/181 |
| 4,194,891 A | | 3/1980 | Earls et al. | ..................... | 55/26 |
| 4,449,990 A | * | 5/1984 | Tedford, Jr. | ..................... | 95/102 |
| 4,452,612 A | * | 6/1984 | Mattia | ............................ | 95/100 |
| 4,612,022 A | | 9/1986 | Berry | ................................ | 55/60 |
| 4,758,253 A | * | 7/1988 | Davidson et al. | ............... | 95/97 |
| 4,968,329 A | * | 11/1990 | Keefer | ............................ | 95/98 |
| 5,133,784 A | * | 7/1992 | Boudet et al. | .................. | 95/100 |
| 5,246,676 A | * | 9/1993 | Hay | ............................... | 423/219 |
| 5,256,172 A | | 10/1993 | Keefer | .......................... | 423/320 |
| 5,393,326 A | * | 2/1995 | Engler et al. | ................... | 95/103 |
| 5,403,384 A | | 4/1995 | Faul et al. | ....................... | 95/96 |
| 5,441,559 A | * | 8/1995 | Petit et al. | ..................... | 96/125 |

FOREIGN PATENT DOCUMENTS

| | | |
|---|---|---|
| WO | WO 97/39821 | 10/1997 |
| WO | WO 99/28013 | 6/1999 |
| WO | WO 00/35560 | 6/2000 |

* cited by examiner

Primary Examiner—Frank M. Lawrence
(74) Attorney, Agent, or Firm—Gowling Lafleur Henderson LLP; Mark W. Sajewycz

(57) ABSTRACT

A gas separation system includes a stator, and a rotor rotatably coupled to the stator, and at least one surge absorber in communication with the stator. The stator includes a stator valve surface and a plurality of function compartments opening into the stator valve surface. The rotor includes a rotor valve surface in communication with the stator valve surface, and a plurality of flow paths for receiving adsorbent material therein. The rotor also includes a plurality of apertures provided in the rotor valve surface and in communication with the flow paths for cyclically exposing the flow paths to the function compartments. The surge absorbers are configured to reduce pressure variations in the function compartments and to maintain each function compartment at one of a plurality of discrete pressure levels. In this manner, substantially uniform gas flow can be maintained through the function compartments and the flow paths without recourse to multistage compression machinery.

9 Claims, 14 Drawing Sheets

SURGE ABSORBER FLOW REGULATION FOR MODULAR PRESSURE SWING ADSORPTION

This application is a continuation of international application PCT/CA00/00732, filed on Jun. 12, 2000.

FIELD OF THE INVENTION

The present invention relates to an apparatus for separating gas fractions from a gas mixture having multiple gas fractions. In particular, the present invention relates to a rotary valve gas separation system having a plurality of rotating adsorbent beds disposed therein for implementing a pressure swing adsorption process for separating out the gas fractions.

BACKGROUND OF THE INVENTION

Pressure swing adsorption (PSA) and vacuum pressure swing adsorption (VPSA) separate gas fractions from a gas mixture by coordinating pressure cycling and flow reversals over an adsorbent bed which preferentially adsorbs a more readily adsorbed component relative to a less readily adsorbed component of the mixture. The total pressure of the gas mixture in the adsorbent bed is elevated while the gas mixture is flowing through the adsorbent bed from a first end to a second end thereof, and is reduced while the gas mixture is flowing through the adsorbent from the second end back to the first end. As the PSA cycle is repeated, the less readily adsorbed component is concentrated adjacent the second end of the adsorbent bed, while the more readily adsorbed component is concentrated adjacent the first end of the adsorbent bed. As a result, a "light" product (a gas fraction depleted in the more readily adsorbed component and enriched in the less readily adsorbed component) is delivered from the second end of the bed, and a "heavy" product (a gas fraction enriched in the more strongly adsorbed component) is exhausted from the first end of the bed.

The conventional system for implementing pressure swing adsorption or vacuum pressure swing adsorption uses two or more stationary adsorbent beds in parallel, with directional valving at each end of each adsorbent bed to connect the beds in alternating sequence to pressure sources and sinks. However, this system is often difficult and expensive to implement due to the complexity of the valving required. Further, the adsorbent beds are often exposed to variations in pressure and gas flow, thereby reducing the efficiency and yield of the gas separation process.

Numerous attempts have been made at overcoming the deficiencies associated with the conventional PSA system. For example, Siggelin (U.S. Pat. No. 3,176,446), Mattia (U.S. Pat. No. 4,452,612), Davidson and Lywood (U.S. Pat. No. 4,758,253), Boudet et al (U.S. Pat. No. 5,133,784) and Petit et al (U.S. Pat. No. 5,441,559) disclose PSA devices using rotary distributor valves whose rotors are fitted with multiple angularly separated adsorbent beds. Ports communicating with the rotor-mounted adsorbent beds sweep past fixed ports for feed admission, product delivery and pressure equalization. However, these prior art rotary valves have considerable dead volume for flow distribution and collection, and expose the adsorbent beds to pulsations in pressure and gas flow. As a result, the rotary valves have poor flow distribution, particularly at high cycle frequencies.

Hay (U.S. Pat. No. 5,246,676) and Engler (U.S. Pat. No. 5,393,326) provide examples of vacuum pressure swing adsorption systems which reduce throttling losses in an attempt to improve the efficiency of the gas separation process system. The systems taught by Hay and Engler use a plurality of vacuum pumps to pump down the pressure of each adsorbent bed sequentially in turn, with the pumps operating at successively lower pressures, so that each vacuum pump reduces the pressure in each bed a predetermined amount. However, with these systems, the vacuum pumps are subjected to large pressure pulsations, stressing the compression machinery and causing large fluctuations in overall power demand. Because centrifugal or axial compression machinery cannot operate under such unsteady conditions, rotary lobe machines are typically used in such systems. However, such machines have lower efficiencies than modern centrifugal compressors/vacuum pumps working under steady state conditions.

Accordingly, there remains a need for a PSA system which is suitable for high volume and high frequency production, and which also reduces pulsations in pressure and gas flow.

SUMMARY OF THE INVENTION

According to the invention, there is provided a gas separation system which addresses deficiencies of the prior art gas separation systems.

The gas separation system, according to the invention, includes a stator, and a rotor rotatably coupled to the stator, and at least one surge absorber in communication with the stator. The stator includes a stator valve surface and a plurality of function compartments opening into the stator valve surface. The rotor includes a rotor valve surface in communication with the stator valve surface, and a plurality of flow paths for receiving adsorbent material therein. The rotor also includes a plurality of apertures provided in the rotor valve surface and in communication with the flow paths for cyclically exposing the flow paths to the function compartments.

The surge absorbers are configured to reduce pressure variations in the function compartments and to maintain each function compartment at one of a plurality of discrete pressure levels. Preferably, the surge absorbers comprise a primary surge chamber coupled to one of the function compartments, and at least one secondary surge chamber coupled to the primary surge chamber and a respective one of the function compartments. Typically, each secondary surge chamber communicates either with an adjacent secondary surge chamber or the primary surge chamber through a flow restrictor so as to subdivide the pressure interval between adjacent primary function compartments into a larger number of more closely spaced pressure levels. Alternately, in one variation, each surge absorber comprises a plurality of parallel plates inclined relative to the function compartments and defining parallel flow restriction channels for maintaining each function compartment at one of the plurality of discrete pressure levels. In this manner, substantially uniform gas flow can be maintained through the function compartments and the flow paths without recourse to multistage compression machinery.

Preferably, the increments between adjacent pressure levels are sized so that the gas flows entering or exiting the gas separation system are substantially steady in both flow velocity and pressure. As a result, the gas separation system can be operated with centrifugal or axial flow compressor and expander compression machinery, each having a small number of compression stages separated by relatively wide pressure intervals.

In a preferred embodiment of the invention, during pressurization and blowdown steps, the several adsorbers passing through the step will converge to the nominal pressure level of each step by a throttling pressure equalization from the pressure level of the previous step experienced by the adsorbers. Flow is provided to the adsorbers in a pressurization step or withdrawn in a blowdown step by compression machinery at the nominal pressure level of that step. Hence flow and pressure pulsations seen by the compression machinery at each intermediate pressure level are minimal by averaging from the several adsorbers passing through the step, although each adsorber undergoes large cyclic changes of pressure and flow.

During the pressurization steps for each adsorber, either (or both) of the apertures of an adsorber already at a pressure is (are) opened respectively to a first or second pressurization compartment at a stepwise higher pressure. Similarly, during the pressurization steps for each adsorber, either (or both) of the apertures of an adsorber already at a pressure is (are) opened respectively to a first or second pressurization compartment at a stepwise lower pressure. Equalization then takes place by flow through the open aperture(s) from the pressurization/blowdown compartment into the adsorber, which by the end of the pressurization/blowdown step has attained approximately the same pressure as the pressurization/blowdown compartment(s). Each pressurization/blowdown compartment is in communication with typically several adsorbers being pressurized (in differing angular and time phase) at any given time, so the pressure in that compartment and the pressurization flow to that compartment are substantially steady.

Since the orifices providing the valving function are immediately adjacent to the ends of the flow paths, the dead volume associated with prior art distribution manifolds is substantially reduced. Also, since the compartments communicating with the first and second valve surfaces are external to the valving function, the compartments do not contribute to dead volume of the adsorbers. As a result, high frequency pressure/vacuum swing adsorption is possible.

BRIEF DESCRIPTION OF THE DRAWINGS

The preferred embodiments of the present invention will now be described, by way of example only, with reference to the drawings in which.

DETAILED DESCRIPTION OF THE PREFERRED EMBODIMENTS

FIGS. 1, 2, 3 and 4

Figure 1:
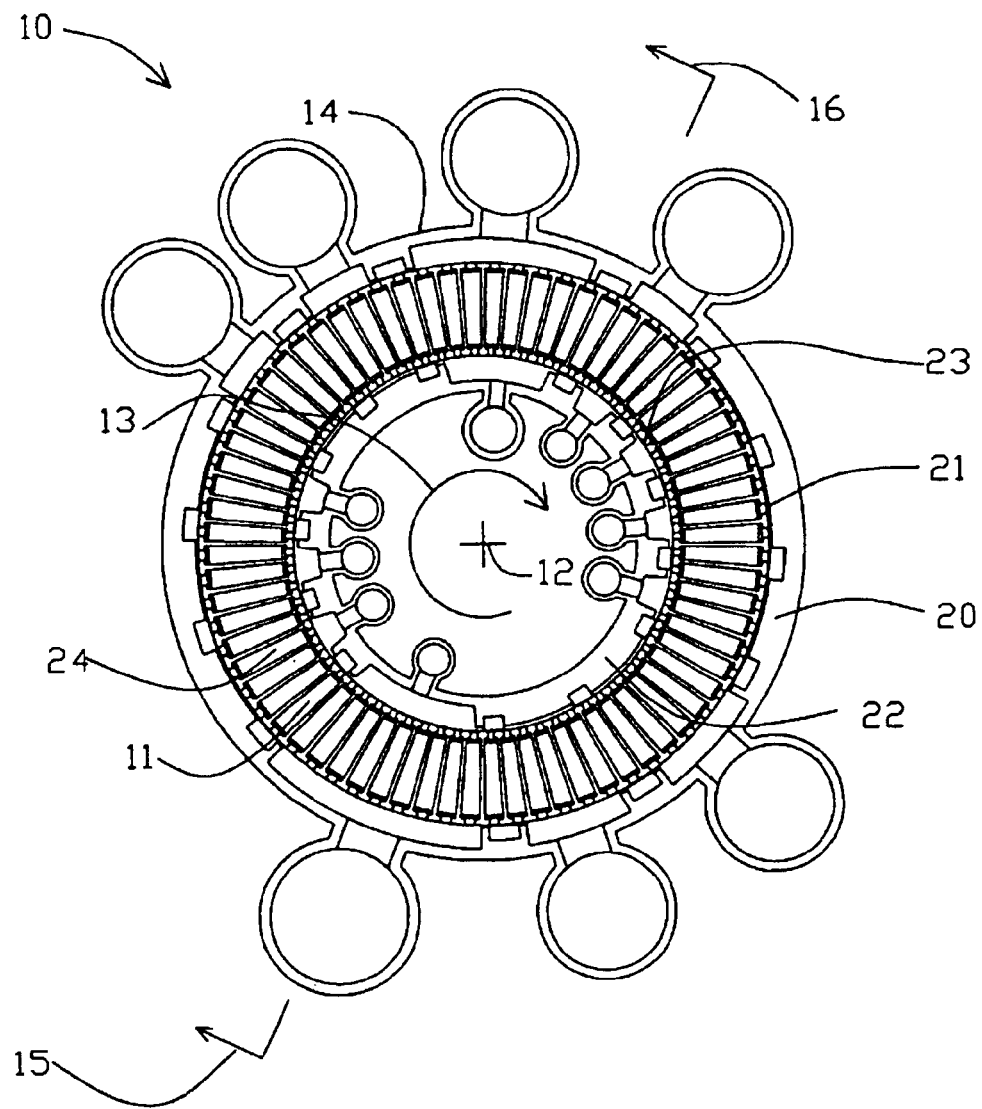
FIG. 1 is a sectional view of a rotary PSA module according to the present invention, showing the stator, the rotor and the adsorber situated in the rotor.

A rotary module 10 according to the present invention is shown in FIGS. 1, 2, 3 and 4. The module includes a rotor 11 revolving about axis 12 in the direction shown by arrow 13 within stator 14. In general, the apparatus of the invention may be configured for flow through the adsorber elements in the radial, axial or oblique conical directions relative to the rotor axis. However, for operation at high cycle frequency, radial flow has the advantage that the centripetal acceleration will lie parallel to the flow path for most favorable stabilization of buoyancy-driven free convection, as well as centrifugal clamping of granular adsorbent with uniform flow distribution.

Figure 2:
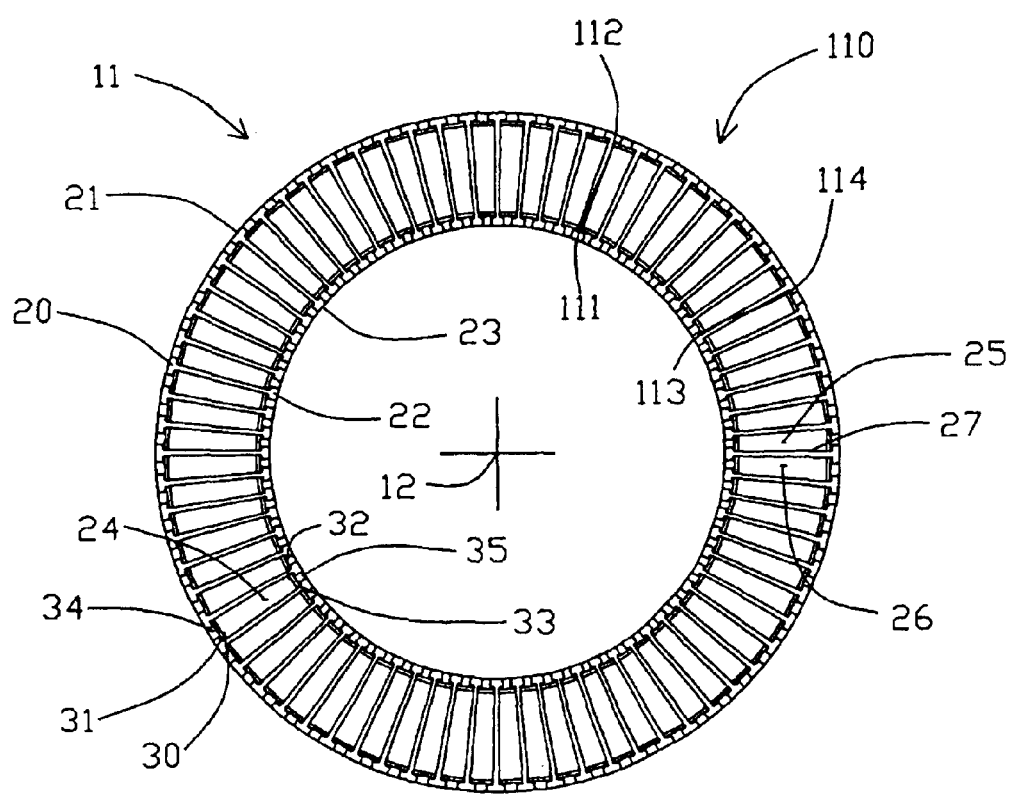
FIG. 2 is a sectional view of the module of FIG. 1, with the stator deleted for clarity.

As shown in FIG. 2, the rotor 11 is of annular section, having concentrically to axis 12 an outer cylindrical wall 20 whose external surface is first valve surface 21, and an inner cylindrical wall 22 whose internal surface is second valve surface 23. The rotor has (in the plane of the section defined by arrows 15 and 16 in FIG. 1) a total of "N" radial flow absorber elements 24. An adjacent pair of absorber elements 25 and 26 are separated by partition 27 which is structurally and sealingly joined to outer wall 20 and inner wall 22. Adjacent absorber elements 25 and 26 are angularly spaced relative to axis 12 by an angle of [360°/N].

Absorber element 24 has a first end 30 defined by support screen 31 and a second end 32 defined by support screen 33. The absorber may be provided as granular adsorbent, whose packing voidage defines a flow path contacting the adsorbent between the first and second ends of the absorber.

First aperture or orifice 34 provides flow communication from first valve surface 21 through wall 20 to the first end 30 of absorber 24. Second aperture or orifice 35 provides flow communication from second valve surface 23 through wall 22 to the second end 31 of absorber 24. Support screens 31 and 33 respectively provide flow distribution 32 between first aperture 34 and first end 30, and between second aperture 35 and second end 32, of absorber element 24. Support screen 31 also supports the centrifugal force loading of the adsorbent.

Figure 3:
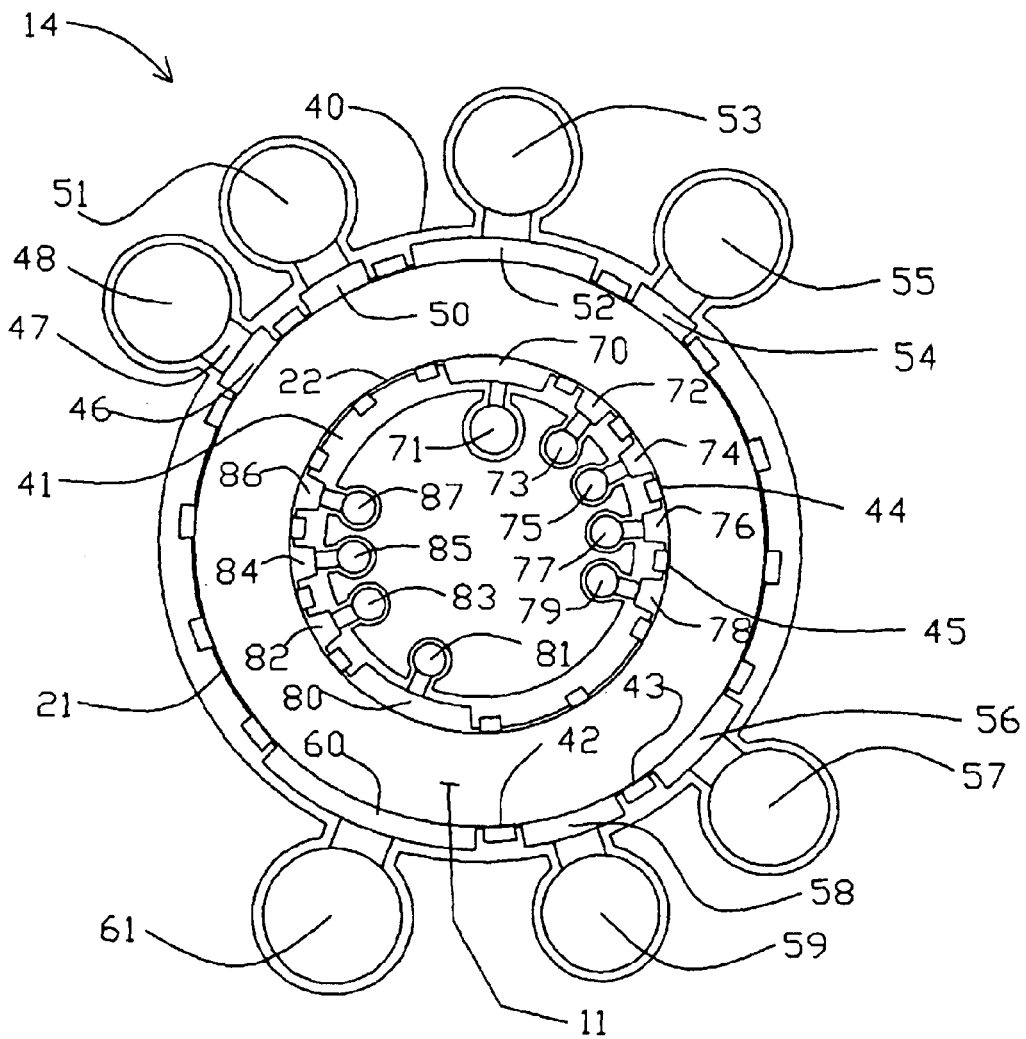
FIG. 3 is a sectional view of the stator shown in FIG. 1, with the adsorbers deleted for clarity.

As shown in FIG. 3, stator 14 is a pressure housing including an outer cylindrical shell or first valve stator 40 outside the annular rotor 11, and an inner cylindrical shell or second valve stator 41 inside the annular rotor 11. Outer shell 40 carries axially extending strip seals (e.g. 42 and 43) sealingly engaged with first valve surface 21, while inner shell 41 carries axially extending strip seals (e.g. 44 and 45) sealingly engaged with second valve surface 23. The azimuthal sealing width of the strip seals is greater than the diameters or azimuthal widths of the first and second apertures 34 and 35 opening through the first and second valve surfaces.

A set of first compartments in the outer shell each open in an angular sector to the first valve surface, and each provide fluid communication between its angular sector of the first valve surface and a manifold external to the module. The angular sectors of the compartments are much wider than the angular separation of the absorber elements. The first compartments are separated on the first sealing surface by the strip seals (e.g. 42). Proceeding clockwise in FIG. 3, in the direction of rotor rotation, a first feed pressurization compartment 46 communicates by conduit 47 to first feed pressurization manifold 48, which is maintained at a first intermediate feed pressure. Similarly, a second feed pressurization compartment 50 communicates to second feed pressurization manifold 51, which is maintained at a second intermediate feed pressure higher than the first intermediate feed pressure but less than the higher working pressure.

For greater generality, module 10 is shown with provision for sequential admission of two feed mixtures, the first feed gas having a lower concentration of the more readily adsorbed component relative to the second feed gas. First feed compartment 52 communicates to first feed manifold 53, which is maintained at substantially the higher working pressure. Likewise, second feed compartment 54 communicates to second feed manifold 55, which is maintained at substantially the higher working pressure. A first countercurrent blowdown compartment 56 communicates to first countercurrent blowdown manifold 57, which is maintained at a first countercurrent blowdown intermediate pressure. A second countercurrent blowdown compartment 58 communicates to second countercurrent blowdown manifold 59, which is maintained at a second countercurrent blowdown intermediate pressure above the lower working pressure. A heavy product compartment 60 communicates to heavy product exhaust manifold 61 which is maintained at substantially the lower working pressure. It will be noted that compartment 58 is bounded by strip seals 42 and 43, and similarly all the compartments are bounded and mutually isolated by strip seals.

A set of second compartments in the inner shell each open in an angular sector to the second valve surface, and each provide fluid communication between its angular sector of the second valve surface and a manifold external to the module. The second compartments are separated on the second sealing surface by the strip seals (e.g. 44). Proceeding clockwise in FIG. 3, again in the direction of rotor rotation, light product compartment 70 communicates to light product manifold 71, and receives light product gas at substantially the higher working pressure, less frictional pressure drops through the adsorbers and the first and second orifices. According to the angular extension of compartment 70 relative to compartments 52 and 54, the light product may be obtained only from adsorbers simultaneously receiving the first feed gas from compartment 52, or from adsorbers receiving both the first and second feed gases.

A first light reflux exit compartment 72 communicates to first light reflux exit manifold 73, which is maintained at a first light reflux exit pressure, here substantially the higher working pressure less frictional pressure drops. A first cocurrent blowdown compartment 74 (which is actually the second light reflux exit compartment), communicates to second light reflux exit manifold 75, which is maintained at a first cocurrent blowdown pressure less than the higher working pressure. A second cocurrent blowdown compartment or third light reflux exit compartment 76 communicates to third light reflux exit manifold 77, which is maintained at a second cocurrent blowdown pressure less than the first cocurrent blowdown pressure. A third cocurrent blowdown compartment or fourth light reflux exit compartment 78 communicates to fourth light reflux exit manifold 79, which is maintained at a third cocurrent blowdown pressure less than the second cocurrent blowdown pressure.

A purge compartment 80 communicates to a fourth light reflux return manifold 81, which supplies the fourth light reflux gas which has been expanded from the third cocurrent blowdown pressure to substantially the lower working pressure with an allowance for frictional pressure drops. The ordering of light reflux pressurization steps is inverted from the ordering or light reflux exit or cocurrent blowdown steps, so as to maintain a desirable "last out-first in" stratification of light reflux gas packets. Hence a first light reflux pressurization compartment 82 communicates to a third light reflux return manifold 83, which supplies the third light reflux gas which has been expanded from the second cocurrent blowdown pressure to a first light reflux pressurization pressure greater than the lower working pressure. A second light reflux pressurization compartment 84 communicates to a second light reflux return manifold 85, which supplies the second light reflux gas which has been expanded from the first cocurrent blowdown pressure to a second light reflux pressurization pressure greater than the first light reflux pressurization pressure. Finally, a third light reflux pressurization compartment 86 communicates to a first light reflux return manifold 87, which supplies the first light reflux gas which has been expanded from approximately the higher pressure to a third light reflux pressurization pressure greater than the second light reflux pressurization pressure, and in this example less than the first feed pressurization pressure.

Figure 4:
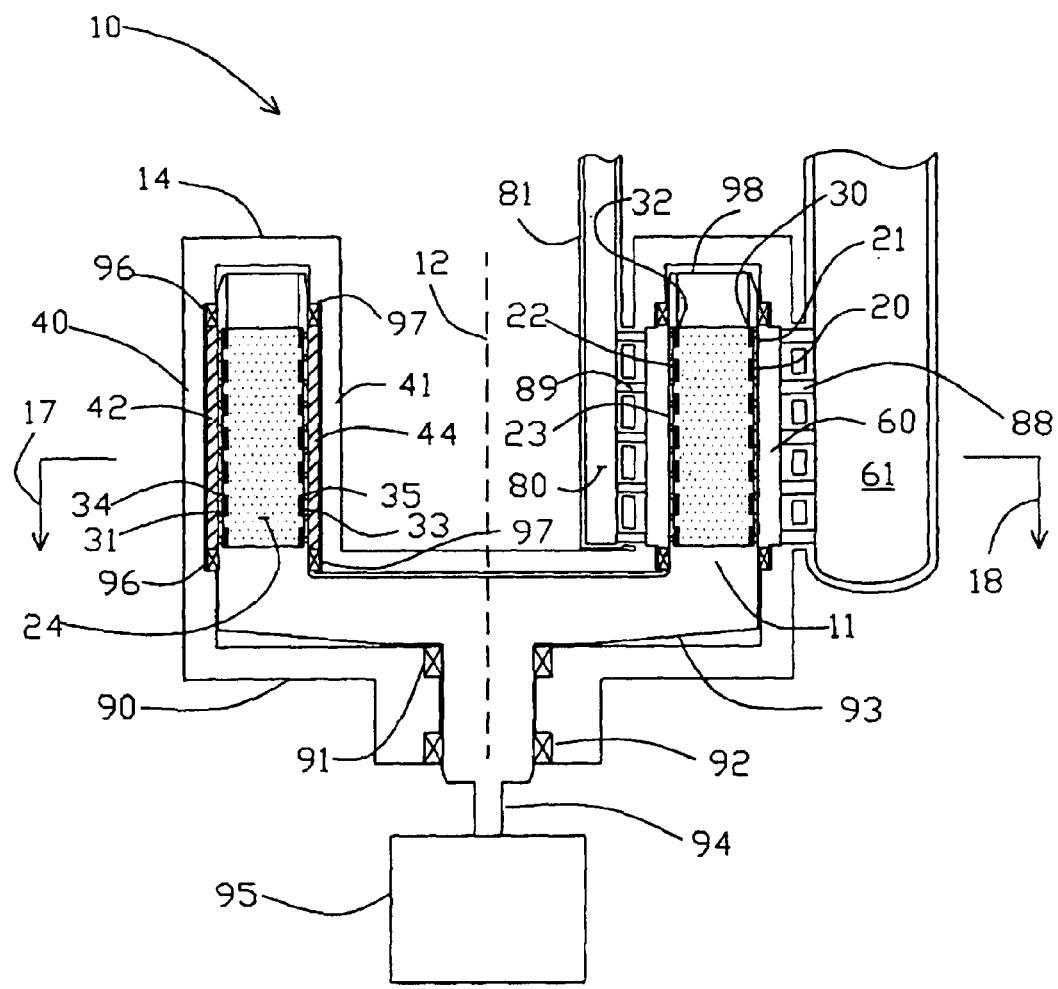
FIG. 4 is an axial section of the module of FIG. 1.

Additional details are shown in FIG. 4. Conduits 88 connect first compartment 60 to manifold 61, with multiple conduits providing for good axial flow distribution in compartment 60. Similarly, conduits 89 connect second compartment 80 to manifold 81. Stator 14 has base 90 with bearings 91 and 92. The annular rotor 11 is supported on end disc 93, whose shaft 94 is supported by bearings 91 and 92. Motor 95 is coupled to shaft 94 to drive rotor 11. The rotor could alternatively rotate as an annular drum, supported by rollers at several angular positions about its rim and also driven at its rim so that no shaft would be required. A rim drive could be provided by a ring gear attached to the rotor, or by a linear electromagnetic motor whose stator would engage an arc of the rim. Outer circumferential seals 96 seal the ends of outer strip seals 42 and the edges of first valve surface 21, while inner circumferential seals 97 seal the ends of inner strip seals 44 and the edges of second valve surface 23. Rotor 11 has access plug 98 between outer wall 20 and inner wall 22, which provides access for installation and removal of the adsorbent in adsorbers 24.

Figure 5:
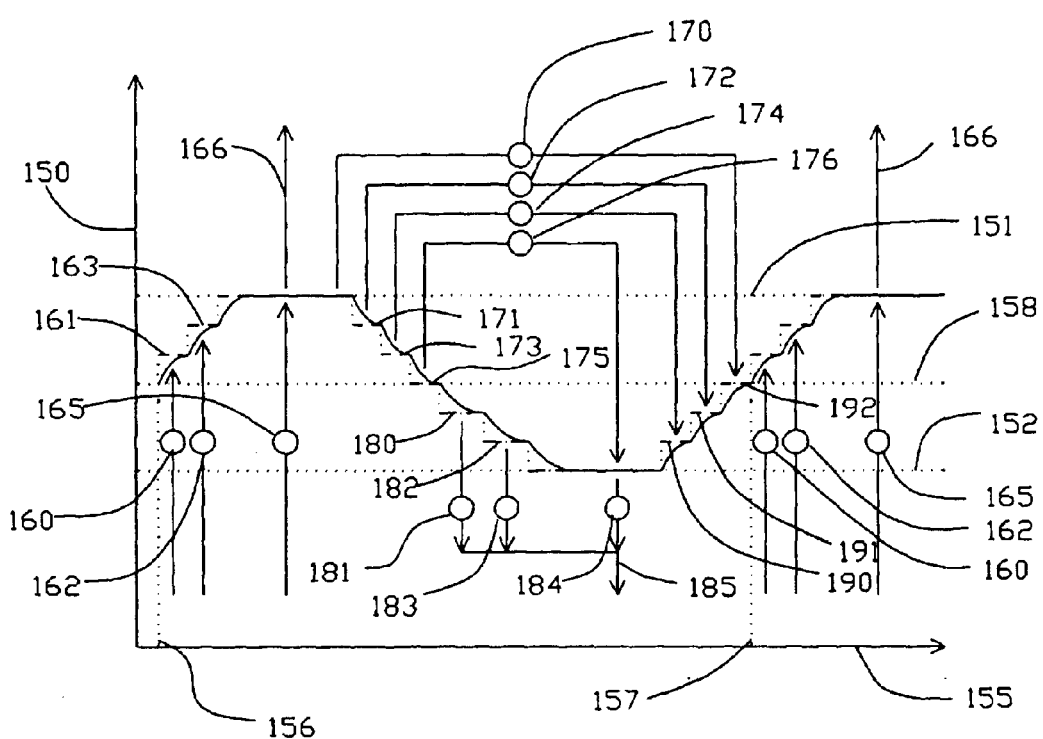
FIG. 5 shows a typical PSA cycle attainable with the present invention.
Figure 6:
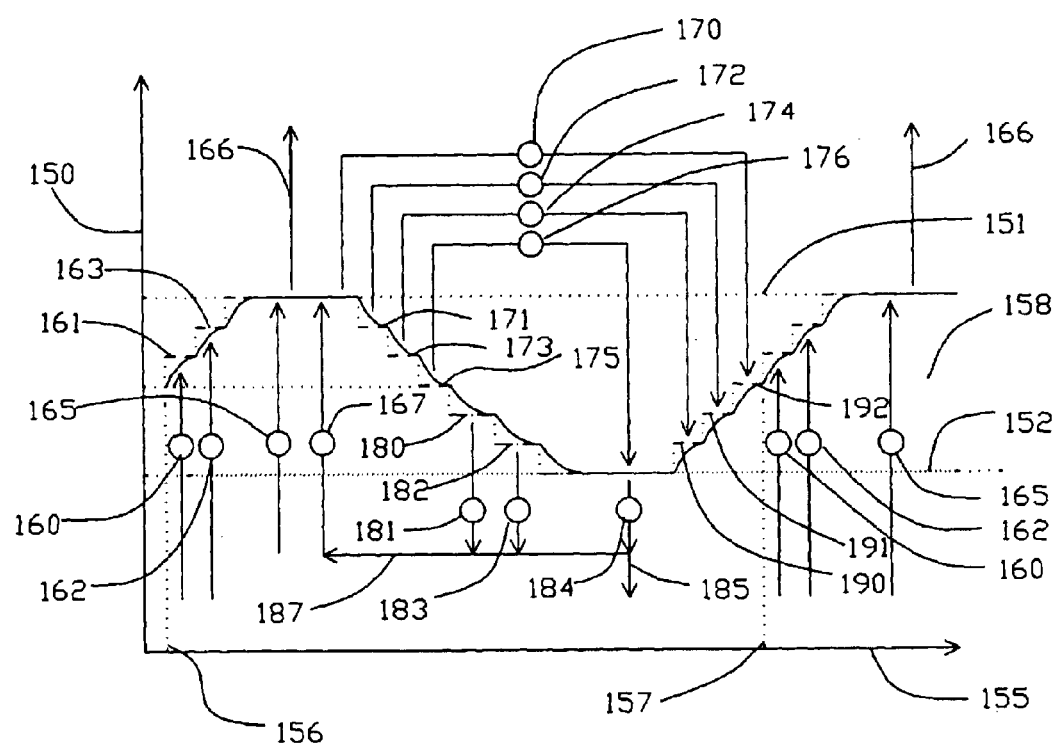
FIG. 6 shows one variation of the PSA cycle with heavy reflux, attainable with the present invention.

FIGS. 5 and 6

FIG. 5 shows a typical PSA cycle which would be obtained using the gas separation system according to the invention, while FIG. 6 shows a similar PSA cycle with heavy reflux recompression of a portion of the first product gas to provide a second feed gas to the process.

In FIGS. 5 and 6, the vertical axis 150 indicates the working pressure in the adsorbers and the pressures in the first and second compartments. Pressure drops due to flow within the absorber elements are neglected. The higher and lower working pressures are respectively indicated by dotted lines 151 and 152.

The horizontal axis 155 of FIGS. 5 and 6 indicates time, with the PSA cycle period defined by the time interval between points 156 and 157. At times 156 and 157, the working pressure in a particular absorber is pressure 158. Starting from time 156, the cycle for a particular absorber (e.g. 24) begins as the first aperture 34 of that absorber is opened to the first feed pressurization compartment 46, which is fed by first feed supply means 160 at the first intermediate feed pressure 161. The pressure in that absorber rises from pressure 158 at time 157 to the first intermediate feed pressure 161. Proceeding ahead, first aperture passes over a seal strip, first closing absorber 24 to compartment 46 and then opening it to second feed pressurization compartment 50 which is feed by second feed supply means 162 at the second intermediate feed pressure 163. The absorber pressure rises to the second intermediate feed pressure.

First aperture 34 of absorber 24 is opened next to first feed compartment 52, which is maintained at substantially the higher pressure by a third feed supply means 165. Once the absorber pressure has risen to substantially the higher working pressure, its second aperture 35 (which has been closed to all second compartments since time 156) opens to light product compartment 70 and delivers light product 166.

In the cycle of FIG. 6, first aperture 34 of absorber 24 is opened next to second feed compartment 54, also maintained at substantially the higher pressure by a fourth feed supply means 167. In general, the fourth feed supply means supplies a second feed gas, typically richer in the more readily adsorbed component than the first feed gas provided by the first, second and third feed supply means. In the specific cycle illustrated in FIG. 6, the fourth feed supply means 167 is a "heavy reflux" compressor, recompressing a portion of the heavy product back into the apparatus. In the cycle illustrated in FIG. 5, there is no fourth feed supply means, and compartment 54 could be eliminated or consolidated with compartment 52 extended over a wider angular arc of the stator.

While feed gas is still being supplied to the first end of absorber 24 from either compartment 52 or 54, the second end of absorber 24 is closed to light product compartment 70 and opens to first light reflux exit compartment 72 while delivering "light reflux" gas (enriched in the less readily adsorbed component, similar to second product gas) to first light reflux pressure let-down means (or expander) 170. The first aperture 34 of absorber 24 is then closed to all first compartments, while the second aperture 35 is opened successively to (a) second light reflux exit compartment 74, dropping the absorber pressure to the first cocurrent blowdown pressure 171 while delivering light reflux gas to second light reflux pressure letdown means 172, (b) third light reflux exit compartment 76, dropping the absorber pressure to the second cocurrent blowdown pressure 173 while delivering light reflux gas to third light reflux pressure letdown means 174, and (c) fourth light reflux exit compartment 78, dropping the absorber pressure to the third cocurrent blowdown pressure 175 while delivering light reflux gas to fourth light reflux pressure letdown means 176. Second aperture 35 is then closed for an interval, until the light reflux return steps following the countercurrent blowdown steps.

The light reflux pressure let-down means may be mechanical expanders or expansion stages for expansion energy recovery, or may be restrictor orifices or throttle valves for irreversible pressure let-down.

Either when the second aperture is closed after the final light reflux exit step (as shown in FIGS. 5 and 6), or earlier while light reflux exit steps are still underway, first aperture 34 is opened to first countercurrent blowdown compartment 56, dropping the absorber pressure to the first countercurrent blowdown intermediate pressure 180 while releasing "heavy" gas (enriched in the more strongly adsorbed component) to first exhaust means 181. Then, first aperture 34 is opened to second countercurrent blowdown compartment 58, dropping the absorber pressure to the first countercurrent blowdown intermediate pressure 182 while releasing heavy gas to second exhaust means 183. Finally reaching the lower working pressure, first aperture 34 is opened to heavy product compartment 60, dropping the absorber pressure to the lower pressure 152 while releasing heavy gas to third exhaust means 184. Once the absorber pressure has substantially reached the lower pressure while first aperture 34 is open to compartment 60, the second aperture 35 opens to purge compartment 80, which receives fourth light reflux gas from fourth light reflux pressure let-down means 176 in order to displace more heavy gas into first product compartment 60.

In FIG. 5, the heavy gas from the first, second and third exhaust means is delivered as the heavy product 185. In FIG. 6, this gas is partly released as the heavy product 185, while the balance is redirected as "heavy reflux" 187 to the heavy reflux compressor as fourth feed supply means 167. Just as light reflux enables an approach to high purity of the less readily adsorbed ("light") component in the light product, heavy reflux enables an approach to high purity of the more readily adsorbed ("heavy") component in the heavy product.

The absorber is then repressurized by light reflux gas after the first and second apertures close to compartments 60 and 80. In succession, while the first aperture 34 remains closed at least initially, (a) the second aperture 35 is opened to first light reflux pressurization compartment 82 to raise the absorber pressure to the first light reflux pressurization pressure 190 while receiving third light reflux gas from the third light reflux pressure letdown means 174, (b) the second aperture 35 is opened to second light reflux pressurization compartment 84 to raise the absorber pressure to the second light reflux pressurization pressure 191 while receiving second light reflux gas from the second light reflux pressure letdown means 172, and (c) the second aperture 35 is opened to third light reflux pressurization compartment 86 to raise the absorber pressure to the third light reflux pressurization pressure 192 while receiving first light reflux gas from the first light reflux pressure letdown means 170. Unless feed pressurization has already been started while light reflux return for light reflux pressurization is still underway, the process (as based on FIGS. 5 and 6) begins feed pressurization for the next cycle after time 157 as soon as the third light reflux pressurization step has been concluded.

The pressure variation waveform in each absorber would be a rectangular staircase if there were no throttling in the first and second valves. In order to provide balanced performance of the adsorbers, preferably all of the apertures are closely identical to each other.

The rate of pressure change in each pressurization or blowdown step will be restricted by throttling in ports (or in clearance or labyrinth sealing gaps) of the first and second valve means, or by throttling in the apertures at first and second ends of the adsorbers, resulting in the typical pressure waveform depicted in FIGS. 5 and 6. Alternatively, the apertures may be opened slowly by the seal strips, to provide flow restriction throttling between the apertures and the seal strips, which may have a serrated edge (e.g. with notches or tapered slits in the edge of the seal strip) so that the apertures are only opened to full flow gradually. Excessively rapid rates of pressure change would subject the absorber to mechanical stress, while also causing flow transients which would tend to increase axial dispersion of the concentration wavefront in the absorber. Pulsations of flow and pressure are minimized by having a plurality of adsorbers simultaneously transiting each step of the cycle, and by providing enough volume in the function compartments and associated manifolds so that they act effectively as surge absorbers between the compression machinery and the first and second valve means.

It will be evident that the cycle could be generalized by having more or fewer intermediate stages in each major step of feed pressurization, countercurrent blowdown exhaust, or light reflux. Furthermore, in air separation or air purification applications, a stage of feed pressurization (typically the first stage) could be performed by equalization with atmosphere as an intermediate pressure of the cycle. Similarly, a stage of countercurrent blowdown could be performed by equalization with atmosphere as an intermediate pressure of the cycle.

FIG. 7

Figure 7:
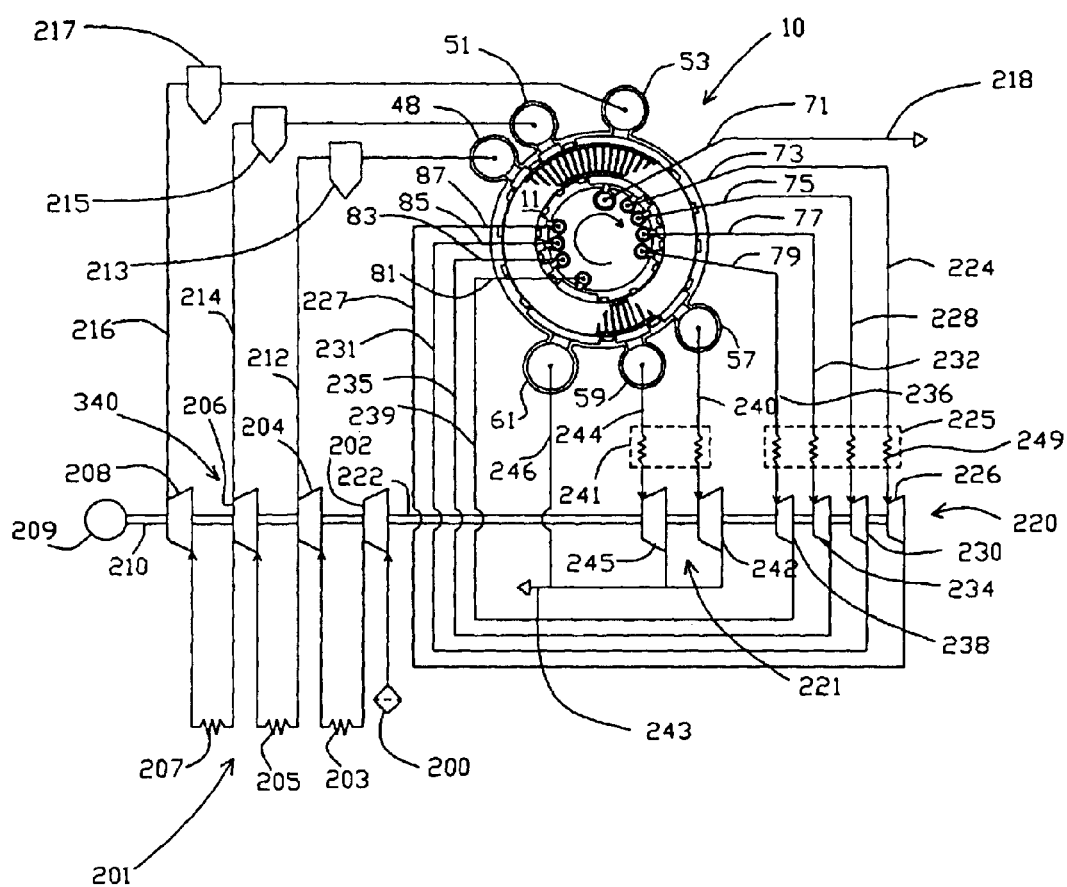
FIG. 7 shows a pressure swing adsorption apparatus according to the present invention, depicting the rotary module shown in FIG. 1 and a compression machine coupled to the rotary module.

FIG. 7 is a simplified schematic of a PSA system, in accordance with the present invention, for separating oxygen from air, using nitrogen-selective zeolite adsorbents. The light product is concentrated oxygen, while the heavy product is nitrogen-enriched air usually vented as waste. The cycle lower pressure 152 is nominally atmospheric pressure. Feed air is introduced through filter intake 200 to a feed compressor 201. The feed compressor includes compressor first stage 202, intercooler 203, compressor second stage 204, second intercooler 205, compressor third stage 206, third intercooler 207, and compressor fourth stage 208. The feed compressor 201 as described may be a four stage axial compressor or centrifugal compressor with motor 209 as prime mover coupled by shaft 210, and the intercoolers are optional. With reference to FIG. 5, the feed compressor first and second stages are the first feed supply means 160, delivering feed gas at the first intermediate feed pressure 161 via conduit 212 and water condensate separator 213 to first feed pressurization manifold 48. Feed compressor third stage 206 is the second feed supply means 162, delivering feed gas at the second intermediate feed pressure 163 via conduit 214 and water condensate separator 215 to second feed pressurization manifold 51. Feed compressor fourth stage 208 is the third feed supply means 165, delivering feed gas at the higher pressure 151 via conduit 216 and water condensate separator 217 to feed manifold 53. Light product oxygen flow is delivered from light product manifold 71 by conduit 218, maintained at substantially the higher pressure less frictional pressure drops.

The apparatus of FIG. 7 includes energy recovery expanders, including light reflux expander 220 (here including four stages) and countercurrent blowdown expander 221 (here including two stages), coupled to feed compressor 201 by shaft 222. The expander stages may be provided for example as radial inflow turbine stages, as full admission axial turbine stages with separate wheels, or as partial admission impulse turbine stages combined in a single wheel.

Light reflux gas from first light reflux exit manifold 73 flows at the higher pressure via conduit 224 and heater 225 to first light pressure letdown means 170 which here is first light reflux expander stage 226, and then flows at the third light reflux pressurization pressure 192 by conduit 227 to the first light reflux return manifold 87. Light reflux gas from second light reflux exit manifold 75 flows at the first cocurrent blowdown pressure 171 via conduit 228 and heater 225 to second light reflux pressure letdown means 172, here the second expander stage 230, and then flows at the second light reflux pressurization pressure 191 by conduit 231 to the second light reflux return manifold 85. Light reflux gas from third light reflux exit manifold 77 flows at the second cocurrent blowdown pressure 173 via conduit 232 and heater 225 to third light reflux pressure letdown means 174, here the third expander stage 234, and then flows at the first light reflux pressurization pressure 190 by conduit 235 to the third light reflux return manifold 83. Finally, light reflux gas from fourth light reflux exit manifold 79 flows at the third cocurrent blowdown pressure 175 via conduit 236 and heater 225 to fourth light reflux pressure letdown means 176, here the fourth light reflux expander stage 238, and then flows at substantially the lower pressure 152 by conduit 239 to the fourth light reflux return manifold 81.

Heavy countercurrent blowdown gas from first countercurrent blowdown manifold 57 flows at first countercurrent blowdown intermediate pressure 180 by conduit 240 to heater 241 and thence to first stage 242 of the countercurrent blowdown expander 221 as first exhaust means 181, and is discharged from the expander to exhaust manifold 243 at substantially the lower pressure 152. Countercurrent blowdown gas from second countercurrent blowdown manifold 59 flows at second countercurrent blowdown intermediate pressure 182 by conduit 244 to heater 241 and thence to second stage 245 of the countercurrent blowdown expander 221 as second exhaust means 183, and is discharged from the expander to exhaust manifold 243 at substantially the lower pressure 152. Finally, heavy gas from heavy product exhaust manifold 61 flows by conduit 246 as third exhaust means 184 to exhaust manifold 243 delivering the heavy product gas 185 to be vented at substantially the lower pressure 152.

Heaters 225 and 241 raise the temperatures of gases entering expanders 220 and 221, thus augmenting the recovery of expansion energy and increasing the power transmitted by shaft 222 from expanders 220 and 221 to feed compressor 201, and reducing the power required from prime mover 209. While heaters 225 and 241 are means to provide heat to the expanders, intercoolers 203, 205 and 207 are means to remove heat from the feed compressor and serve to reduce the required power of the higher compressor stages. The intercoolers 203, 205, 207 are optional features of the invention.

If light reflux heater 249 operates at a sufficiently high temperature so that the exit temperature of the light reflux expansion stages is higher than the temperature at which feed gas is delivered to the feed manifolds by conduits 212, 214 and 216, the temperature of the second ends 35 of the adsorbers 24 may be higher than the temperature of their first ends 34. Hence, the adsorbers have a thermal gradient along the flow path, with higher temperature at their second end relative to the first end. This is an extension of the principle of "thermally coupled pressure swing adsorption" (TCP) turbine engines having a compressor 201 and an expander 220. Heat provided to the PSA process by heater 225 assists powering the process according to a regenerative thermodynamic power cycle, similar to advanced regenerative gas turbine engines approximately realizing the Ericsson thermodynamic cycle with intercooling on the compression side and interstage heating on the expansion side. In the instance of PSA applied to oxygen separation from air, the total light reflux flow is much less than the feed flow because of the strong bulk adsorption of nitrogen. Accordingly the power recoverable from the expanders is much less than the power required by the compressor, but will still contribute significantly to enhanced efficiency of oxygen production.

If high energy efficiency is not of highest importance, the light reflux expander stages and the countercurrent blowdown expander stages may be replaced by restrictor orifices or throttle valves for pressure letdown. The schematic of FIG. 7 shows a single shaft supporting the compressor stages, the countercurrent blowdown or exhaust expander stages, and the light reflux stages, as well as coupling the compressor to the prime mover. However, it should be understood that separate shafts and even separate prime movers may be used for the distinct compression and expansion stages within the scope of the present invention.

FIG. 8

Figure 8:
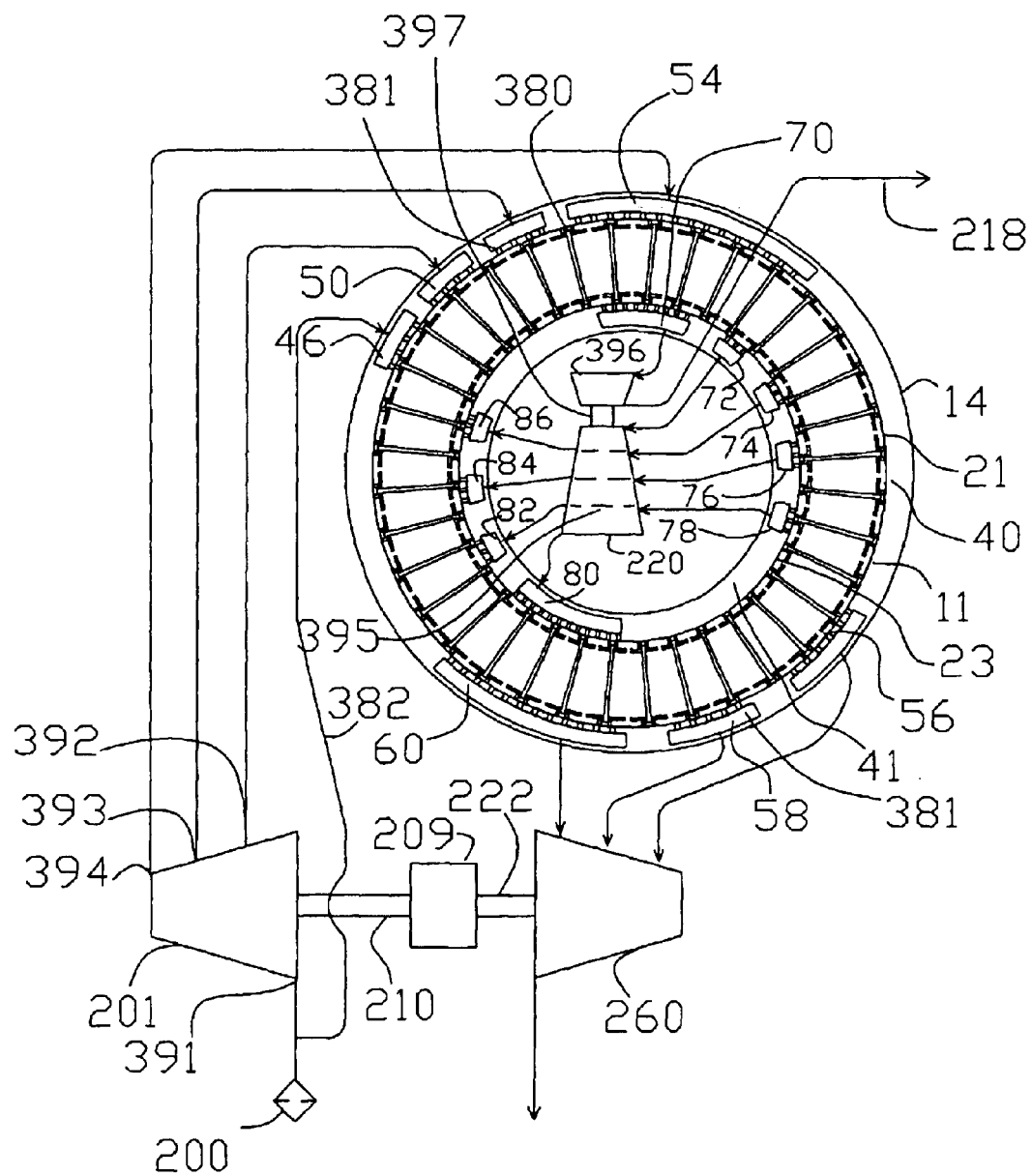
FIG. 8 shows a radial-flow-configured rotary PSA module, with the compression machine deleted for clarity.

FIG. 8 shows a radial flow rotary PSA module 300 in which the first and second valve surface 21, 23 are respectively provided as hard-faced ported surfaces on the first and second valve stators 40 and 41. Sliding seals 380 are provided on rotor 11 between each adsorber 24 and its neighbours, to engage both valve surfaces 21, 23 in fluid sealing contact. Seals 380 may have a wear surface of a suitable composite material based on PTFE or carbon, and should be compliantly mounted on rotor 11 so as to compensate for wear, deflections and misalignment. Ports 381 may be sized, particularly at the leading edge of each compartment, to provide controlled throttling for smooth pressure equalization between adsorbers and that compartment, as each adsorber in turn is opened to that compartment.

Split stream vacuum pump 260 receives the countercurrent blowdown and exhaust flow in three streams receiving exhaust gas at incrementally reduced pressures from countercurrent blowdown compartment 56, compartment 58 and compartment 60. The combined exhaust gas is discharged as heavy product gas. In this example, initial feed pressurization is performed from atmosphere, so a first feed pressurization conduit 382 admits feed air directly from inlet filter 200 to first feed pressurization compartment 46 at substantially atmospheric pressure. The first discharge port of feed compressor 201 now communicates to second feed pressurization compartment 50. The compressor is shown as a split stage machine with inlet 391, and three discharges 392, 393 and 394 at incrementally higher pressures.

To achieve light reflux pressure letdown with energy recovery, a split stream light reflux expander 220 is provided to provide pressure let-down of four light reflux stages with energy recovery. The light reflux expander 220 provides pressure let-down for each of four light reflux stages. The stages may optionally be compartmentalized within the light reflux expander 220 to minimize mixing of gas concentration between the stages. The light product purity will tend to decline from the light reflux stages of higher pressure to those of lower pressure; so that a desirable stratification of the light reflux can be maintained if mixing is avoided.

Light reflux expander 220 is coupled to drive light product pressure booster compressor 396. Compressor 396 receives the light product from compartment 70, and delivers light product (compressed to a delivery pressure above the higher pressure of the PSA cycle) from delivery conduit 218. Since the light reflux and light product are both enriched oxygen streams of approximately the same purity, expander 220 and light product compressor 396 may be hermetically enclosed in a single housing similar to a turbocharger.

FIG. 9

Figure 9:
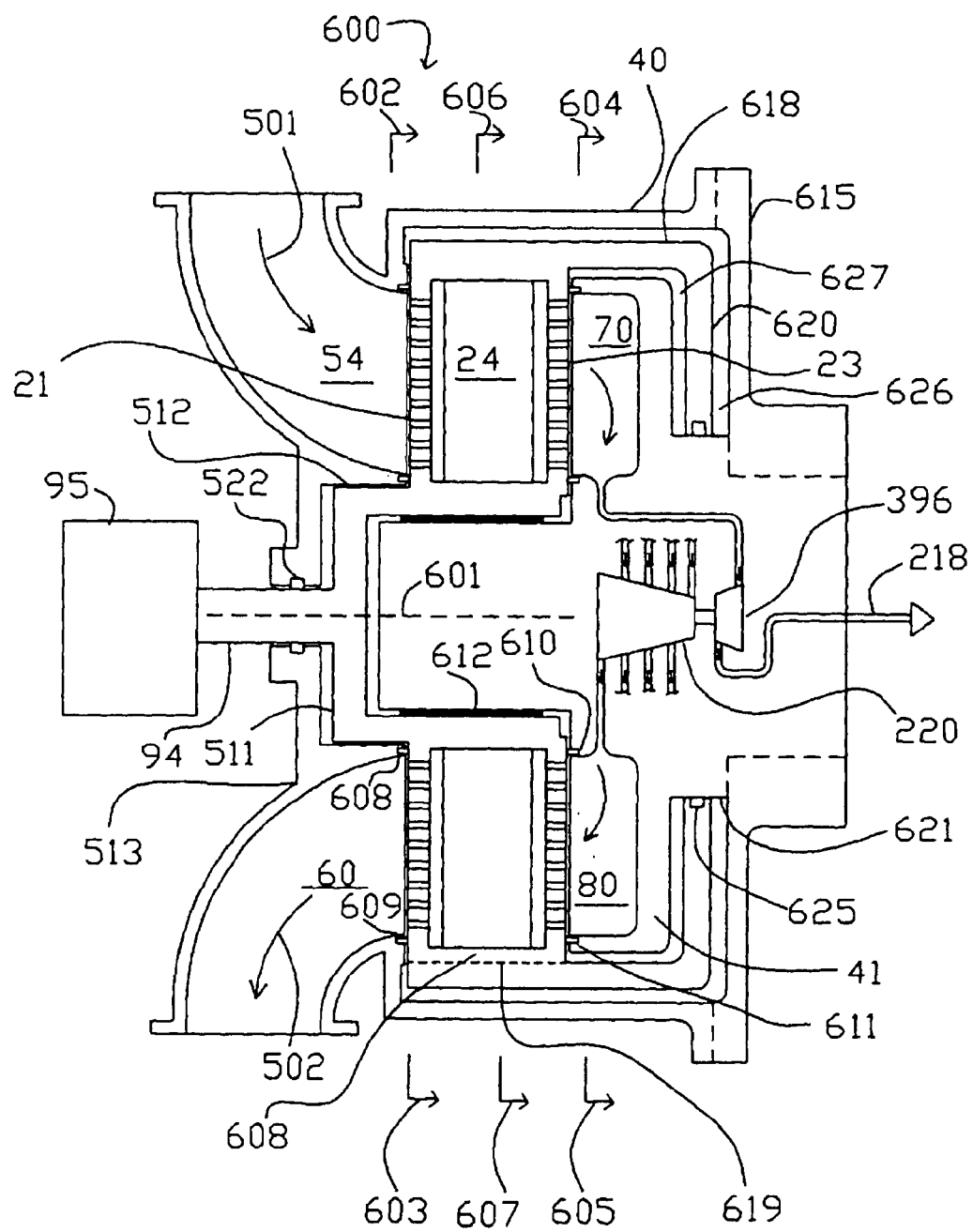
FIG. 9 shows an axial-flow-configured rotary PSA module, with the compression machine deleted for clarity.

FIG. 9 is an axial sectional view of an axial flow rotary PSA module 600 for small scale oxygen production. The view is taken through compartments 54 and 70 at the higher pressure, and compartments 60 and 80 at the lower pressure. The flow path in adsorbers 24 is now parallel to axis 601. A better understanding will be obtained from FIGS. 10 and 11, which are cross sections of module 600 in the planes respectively defined by arrows 602–603 and 604–605.

The adsorber rotor 11 contains the "N" adsorbers 24 in adsorber wheel 608, and revolves between the first valve stator 40 and the second valve stator 41. Compressed feed air is supplied to compartment 54 as indicated by arrow 501, while nitrogen enriched exhaust gas is exhausted from compartment 60 as indicated by arrow 502.

At the ends of rotor 11, circumferential seals 608 and 609 bound first sealing face 21, and circumferential seals 610 and 611 bound second sealing face 23. The sealing faces are flat discs. The circumferential seals also define the ends of seals between the adsorbers, or alternatively of dynamic seals in the sealing faces between the stator compartments. Rotor 11 has a stub shaft 511 supported by bearing 512 in first bearing housing 513, which is integral with first valve stator 40. Second valve stator 41 has a stub shaft engaging the rotor 11 with guide bushing 612.

A flanged cover plate 615 is provided for structural connection and fluid sealing enclosure between the first valve stator 40 and the second valve stator 41. Rotor 11 includes seal carrier 618 attached at joint 619 to adsorber wheel 608, and extending between the back of second valve stator 41 and cover plate 615 to sealing face 621 which is contacted by dynamic seal 625. Seal 625 prevents contamination of the light product gas by leakage from chamber 626 adjacent the first valve sealing face 21 to chamber 627 adjacent the second valve sealing face 23.

Seal 625 needs to be tight against leakage that could compromise product purity. By manufacturing this seal to a smaller diameter than the valve faces outer diameter, frictional torque from this seal is greatly reduced than if this seal were at the full rotor diameter. The circumferential perimeter exposed to leakage is also reduced. As in FIG. 8, a split stream light reflux expander 220 with close-coupled light product compressor 396, may be installed inside the light valve stator.

Figure 10:
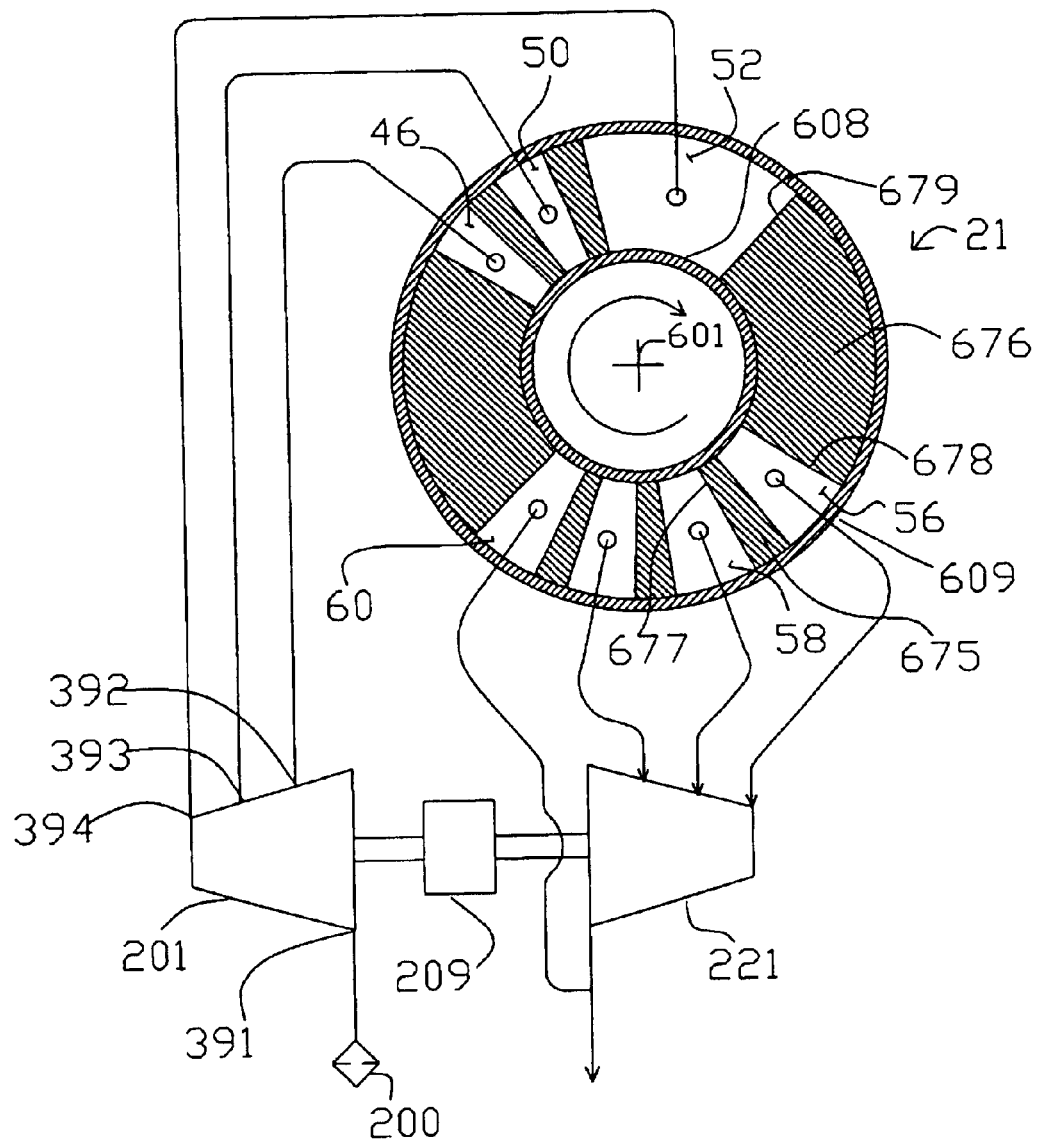
FIG. 10 shows the first valve face of the rotary PSA module shown in FIG. 9.
Figure 11:
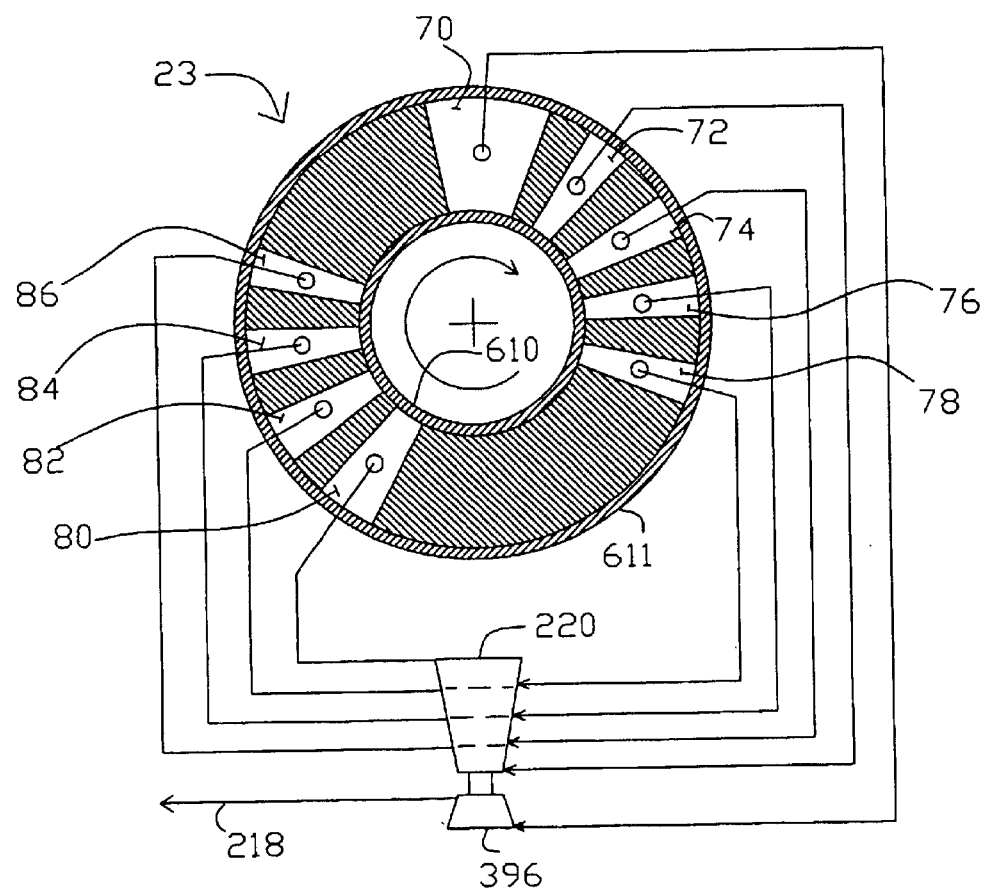
FIG. 11 shows the second valve face of the rotary PSA modules shown in FIG. 9.

FIGS. 10 and 11

FIG. 10 shows the first valve face 21 of the axial flow rotary PSA module 600 shown in FIG. 9, at section 602–603, with fluid connections to a split stream feed compressor 201 and a split stream countercurrent blowdown expander 221. FIG. 11 shows the second valve face 23 of the axial flow rotary PSA module 600 shown in FIG. 9, at section 604–605, with fluid connections to a split stream light reflux expander 220 and light product booster compressor 396.

Arrow 670 indicates the direction of rotation by absorber rotor 11. The open area of valve face 21 ported to the feed and exhaust compartments is indicated by clear angular segments 46, 50, 52, 56, 58, 60 corresponding to those compartments, between circumferential seals 608 and 609. The closed area of valve face 21 between compartments is indicated by cross-hatched sectors 675 and 676. Similarly, the open area of valve face 23 ported to the light reflux exit and return compartments is indicated by clear angular segments 70, 72, 74, 76, 78, 80, 82, 84, 86 corresponding to those compartments, while the closed are of valve face 23 between the light reflux and return compartments is indicated by the cross-hatched sectors.

Typical closed sector 675, shown in FIG. 10, provides a transition for an absorber, between being open to compartment 56 and open to compartment 58. Gradual opening is provided at the leading edges 677 and 678 of compartments, so as to achieve gentle pressure equalization of an absorber being opened to a new compartment. Much wider closed sectors (e.g. 676) are provided to substantially close flow to or from one end of the adsorbers when pressurization or blowdown is being performed from the other end.

Sealing between compartments at typical closed sectors (e.g. 675) may be provided by rubbing seals on either stator or rotor against a ported hard-faced sealing counter face on the opposing rotor or stator, or by narrow gap clearance seals on the stator with the area of the narrow sealing gap defined by the cross hatched area of the nominally closed surface. Rubbing seals may be provided as radial strip seals, with a self-lubricating solid material such as suitable PTFE compounds or graphite, or as brush seals in which a tightly packed brush of compliant fibers rubs against the counter face.

If the rubbing seals are on the rotor (between adjacent adsorbers), cross-hatched sectors 675 and 676 would be non-ported portions of the hard-faced sealing counter face on the stator. If the rubbing seals are on the stator, the ported hard-faced counter face is on the rotor valve face. Those rubbing seals could be provided as full sector strips for narrow closed sectors (e.g. 675). For the wider closed sectors (e.g. 676), narrow radial rubbing seals may be used as the edges 678 and 679, and at intervals between those edges, to reduce friction in comparison with rubbing engagement across the full area of such wide sectors.

Clearance seals are attractive, especially for larger scale modules with a very large number "N" of adsorbers in parallel. The leakage discharge coefficient to or from the clearance gap varies according to the angular position of the absorber, thus providing gentle pressure equalization as desired. The clearance gap geometry is optimized in typical nominally closed sectors (e.g. 675) so that the leakage in the clearance gap is mostly used for absorber pressure equalization, thus minimizing through leakage between compartments. Preferably, the clearance gap is tapered in such sectors 675 to widen the gap toward compartments being opened, so that the rate of pressure change in pressure equalization is close to linear and rubbing friction is reduced. For wide closed sectors (e.g. 676) the clearance gap would be relatively narrow to minimize flows at that end of adsorbers passing through those sectors.

For all types of valve face seals described above, it is preferable that consistent performance be achieved over time, and that all "N" adsorbers experience the same flow pattern after all perturbations from seal imperfections. This consideration favors placing rubbing seals on the stator so that any imperfections are experienced similarly by all adsorbers. If the seals are mounted on the rotor between adsorbers, it is preferable that they are closely identical and highly reliable to avoid upsetting leakages between adjacent adsorbers.

To compensate for misalignment, thermal distortion, structural deflections and wear of seals and bearings, the sealing system should have a suitable self-aligning suspension. Thus, rubbing seal or clearance seal elements may be supported on elastomeric supports, bellows or diaphragms to provide the self-aligning suspension with static sealing behind the dynamic seal elements. Rubbing seals may be energized into sealing contact by a combination of elastic preload and gas pressure loading.

Clearance seals require extremely accurate gap control, which may be established by rubbing guides. However, gap control for blowdown compartments may also be achieved through a self-regulating seal in which the correct gap is maintained by a balance between gas pressure in the gap of a clearance seal segment, and the pressures of adjacent blowdown compartments loading the seal behind that segment. For pressurization compartments, gap control may be achieved through a self-regulating seal in which the correct gap is maintained by a balance between gas pressure in the gap of a clearance seal segment, and an intermediate pressure loading the seal behind that segment, with the intermediate pressure being the average of the pressure of the flow paths approaching the clearance seal segment and the pressure of flow paths leaving the clearance seal segment.

Figure 12:
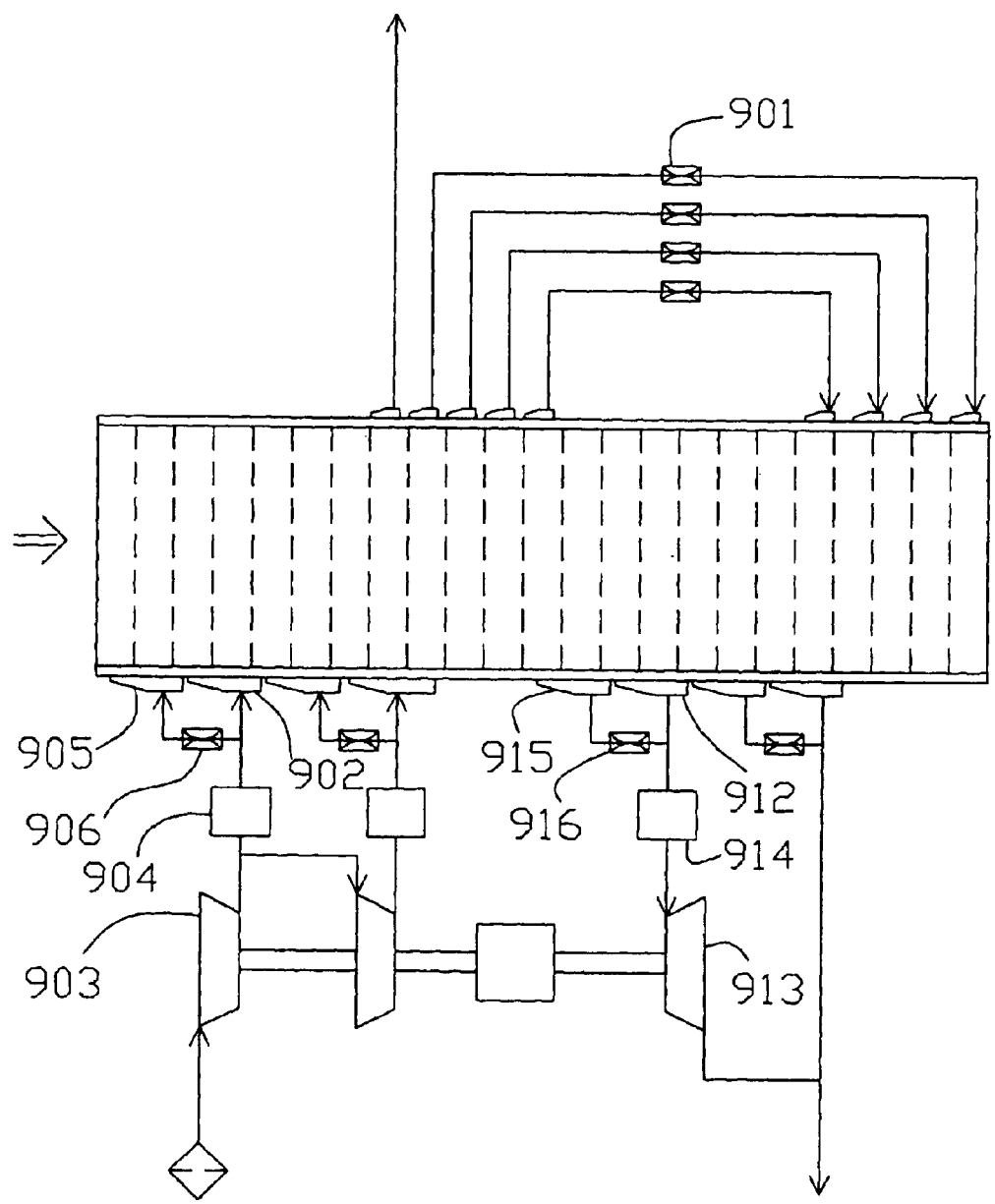
FIG. 12 shows a PSA system using flow restrictors for pressure let-down.
Figure 13:
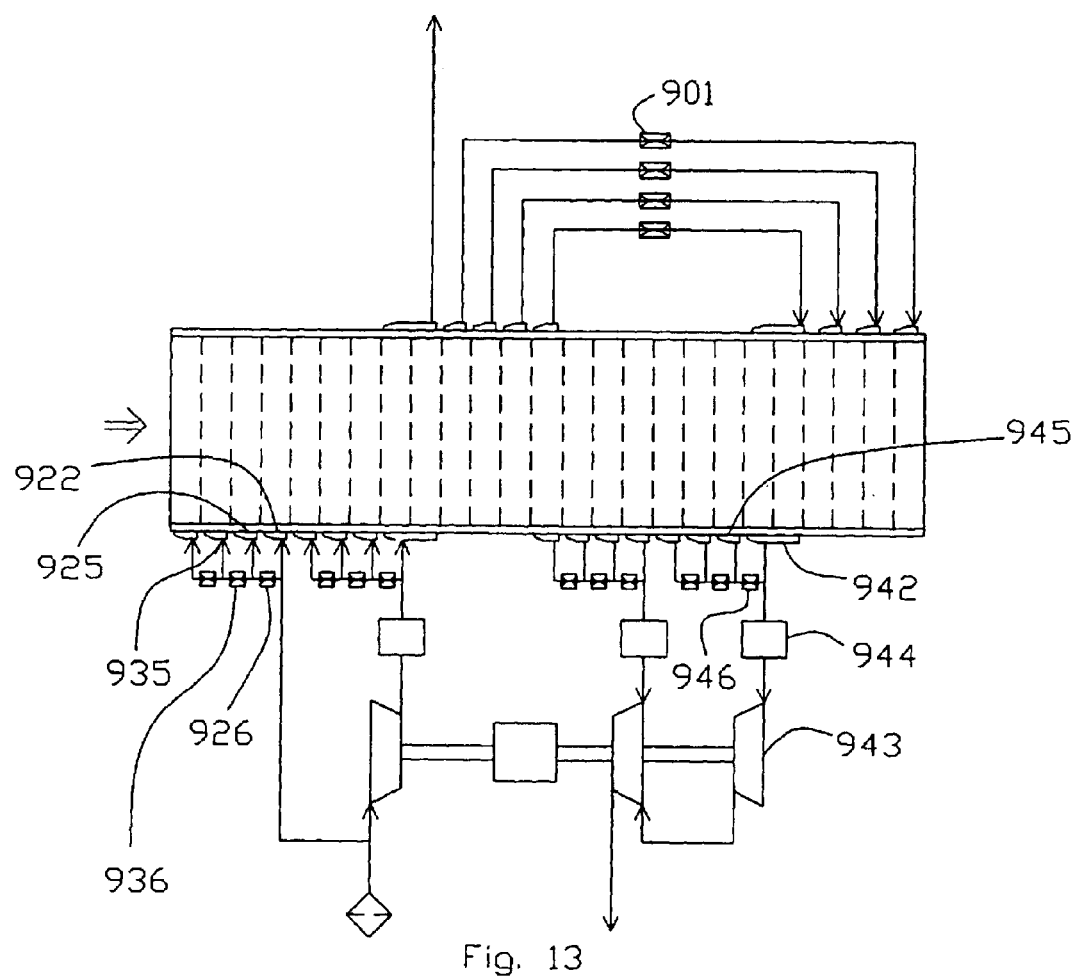
FIGS. 13 and 14 show a vacuum-PSA system using alternative flow restrictors for pressure let-down.
Figure 14:
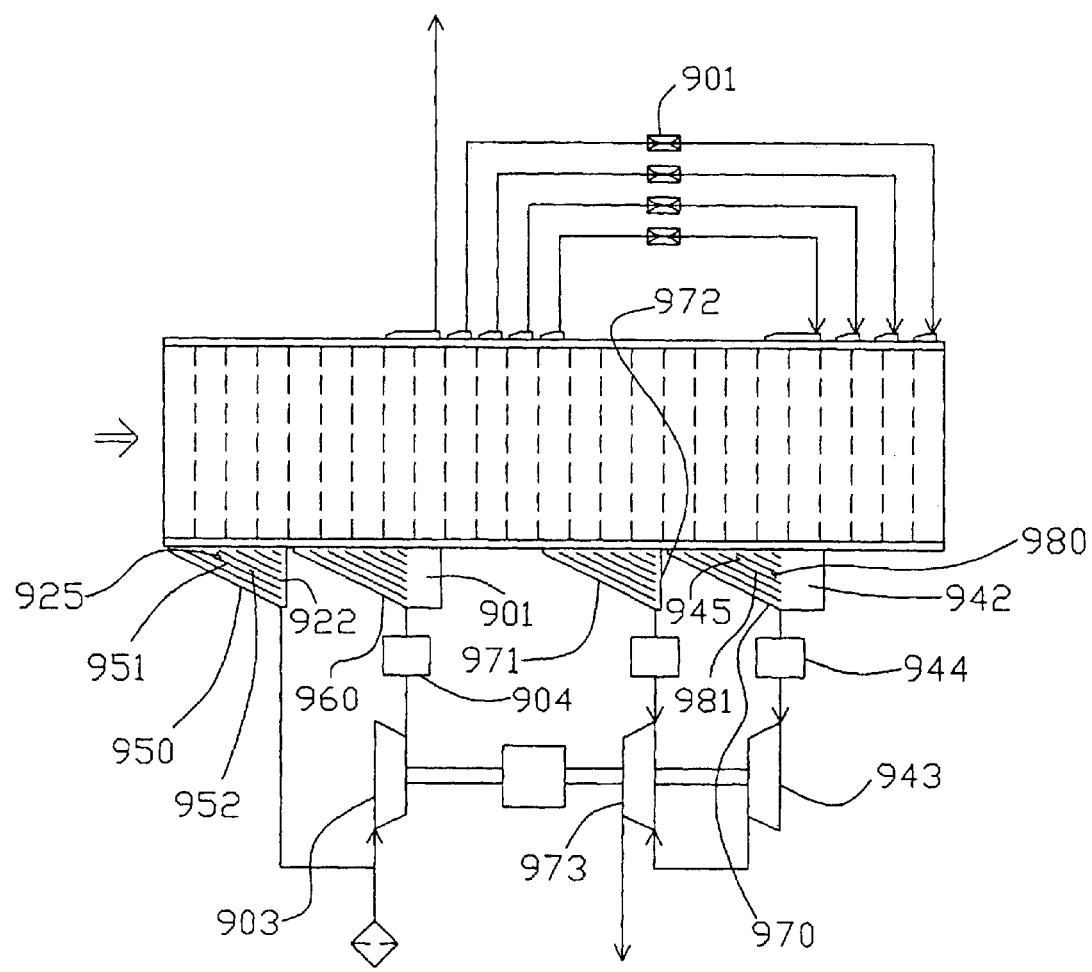

FIGS. 12, 13 and 14

In order to use centrifugal or axial compression machinery with rotary PSA devices having a relatively smaller number of angularly discrete adsorbers, it is necessary to provide means to stabilize the flow and pressure conditions at the first function compartments to which feed compression stages, countercurrent blowdown exhausters (expanders or vacuum pumps) are connected. It is also desirable to provide means to regulate flows entering or exiting the adsorbers through the valve faces during pressurization or blowdown steps, so as to prevent abrupt transient pressure changes and flow surges detrimental to the process and potentially damaging to the adsorbers.

Stabilization is provided within the invention in part by providing surge absorbers or equivalent volume in or communicating with each function compartment to which compression stages, expander stages, or vacuum pump stages are coupled. The surge absorber volume includes the internal volume of the function compartment, any additional surge chamber communicating thereto, and the internal volume of conduits communicating between the compression machinery stages and the function compartment. The said surge absorber volume is preferably at least equal in volume to the total volume of the adsorbers communicating to that function compartment at any time. More preferably, the surge absorber volume is preferably at least twice as large in volume as the total volume of the adsorbers communicating to that function compartment at any time.

Further benefits of stabilization and transient flow regulation may be achieved by providing some first function compartments as primary function compartments communicating to compression machinery stages and with surge absorber volume cooperating therewith, and then also providing secondary function compartments communicating to the primary function compartments through flow restrictors cooperating with the function compartments in the stator valve faces. The flow restrictors may be fixed orifices, adjustable throttle valves, pressure regulators, or differential pressure regulators. The function compartments cooperate in groups, so that one primary function compartment cooperates with one or a plurality of secondary compartments.

In FIG. 12, feed pressurization compartment 902 is a primary function compartment supplied by feed compressor stage 903 through surge absorber 904. Feed pressurization compartment 905 is a secondary function compartment supplied through flow restrictor 906 from compartment 902.

Similarly, countercurrent blowdown compartment 912 is a primary function compartment exhausting to expander stage 913 through surge absorber 914. Countercurrent blowdown pressurization compartment 915 is a secondary function compartment supplied through flow restrictor 916 from compartment 912. As will be appreciated, the present invention may include a greater number of secondary function compartments than that shown in FIG. 12.

In FIG. 13, a vacuum-PSA system is shown, in which feed pressurization compartment 922 is a primary function compartment supplied from atmosphere. Feed pressurization compartment 925 is a secondary function compartment supplied through flow restrictor 926 from compartment 922. Feed pressurization compartment 935 is a secondary function compartment supplied through flow restrictors 926 and 936 from compartment 922. The flow restrictors cooperate with the adsorbers to establish incremental intermediate pressure levels in the function compartments so that the pressure changes in the adsorbers are small and the corresponding pressurization flows are smooth.

Similarly, exhaust compartment 942 is a primary function compartment exhausting to vacuum pump stage 943 through surge absorber 944. Countercurrent blowdown pressurization compartment 945 is a secondary function compartment supplied through flow restrictor 946 from compartment 942. As above, the vacuum-PSA system may include a greater number of secondary function compartments than that shown in FIG. 13. Thus the compression machinery (compressors and vacuum pumps) coupled to the primary function compartments can have a small number of stages separated by relatively wide pressure intervals, while pressurization and blowdown steps of the adsorbers are conducted over a much larger number of relatively narrow pressure intervals.

FIG. 14 shows a variation of the vacuum-PSA system shown in FIG. 13, in which the secondary function compartments and flow restrictors associated with each primary function compartment are finely divided to become almost a continuum. For each primary function compartment, a flow distributor is provided. The flow distributor comprises a stack of substantially parallel plates separated by narrow spacers (e.g. wire mesh) to define flow restriction channels between each adjacent pair of plates, with each flow restriction channel communicating with the primary function compartment and the first valve face. At its opening to the valve face, each flow restriction channel defines a secondary function compartment. The flow restriction channel are inclined relative to the valve face so that the length of the flow restriction channels from the primary function compartment to the valve face progressively increases in proportion to the angular separation of the secondary function compartment from the corresponding primary function compartment.

In FIG. 14, feed pressurization compartment 922 is a primary function compartment supplied from atmosphere and cooperating with flow distributor 950. The flow distributor includes a plurality of parallel plates 951 with spacers which define narrow flow restrictor channels 952. Each flow restrictor channel 952 defines a secondary feed pressurization compartment 925 supplied by feed pressurization compartment 922. Flow distributor 960 cooperates with feed supply compartment 961 fed from feed compressor 903 through surge absorber and optional aftercooler 904.

Similarly, flow distributors 970 and 971 cooperate respectively with exhaust compartment 942 and countercurrent blowdown compartment 972, with the compartments 942, 972 being exhausted respectively by vacuum pump stages 943 and 973. In flow distributor 970, flow restrictor channels 980 and secondary function compartments 945 are defined between parallel plates 981. The flow restrictors cooperating with the adsorbers establish the incremental intermediate pressure levels in the compartments so that the pressure change in the adsorbers and the corresponding pressurization flows are smooth. Thus the compression machinery (compressors and vacuum pumps) coupled to the primary function compartments can have a small number of stages separated by relatively wide pressure intervals, while pressurization and blowdown steps are conducted over a smooth pressure gradient whose profile is dictated by the flow distributors and the gas capacity of the adsorbers.

The present invention is defined by the claims appended hereto, with the foregoing description being illustrative of the preferred embodiments of the present invention. Those of ordinary skill may envisage certain additions, deletions or modifications to the described embodiments which, although not explicitly disclosed herein, do not depart from the spirit or scope of the invention as defined by the appended claims.

I claim:

1. A gas separation system for extracting a first gas fraction and a second gas fraction from a gas mixture including the first and second fractions, the gas separation system comprising:

a stator including a stator valve surface and a plurality of function compartments opening into the stator valve surface;

a rotor rotatably coupled to the stator and including a rotor valve surface in communication with the stator valve surface, a plurality of flow paths for receiving adsorbent material therein, and a plurality of apertures provided in the rotor valve surface and in communication with the flow paths for cyclically exposing the flow paths to the function compartments; and a surge absorber fluidly coupled to a plurality of function compartments opening into the stator valve surface by a corresponding plurality of parallel, independent flow paths, for reducing pressure variations in the function compartments.

2. The gas separation system according to claim 1, wherein the surge absorber comprises a primary surge chamber in communication with one of the function compartments, the primary surge chamber including a port for coupling to compression machinery, a secondary surge chamber in communication with another one of the function compartments, and a first flow restrictor in communication with the primary and secondary surge chambers for facilitating pressure letdown between the compression machinery and the another function compartment.

3. The gas separation system according to claim 2, wherein the secondary surge chamber comprise a plurality of tertiary surge chambers in communication with respective ones of the function compartments, and a plurality of second flow restrictors each being in communication with adjacent ones of the tertiary surge chambers for maintaining each said function compartment at one of a plurality of discrete pressure levels.

4. The gas separation system according to claim 2 or 3, wherein the compression machinery comprises one of a compressor, an expander, and a vacuum pump.

5. The gas separation system according to claim 2 or 3, wherein each said the flow restrictor comprises one of a fixed orifice, an adjustable throttle valve, and a pressure regulator.

6. The gas separation system according to claim 1, wherein the surge absorber comprises a plurality of parallel flow restriction channels, each said flow channel being coupled to a respective one of the function compartments and having a respective channel length for maintaining each said function compartment at one of a plurality of discrete pressure levels.

7. The gas separation system according to claim 6, wherein the surge absorber comprises a plurality of parallel plates inclined relative to the function compartments, each said flow channel being defined between adjacent ones of the parallel plates.

8. The gas separation system according to claim 1, wherein the surge absorber comprises a surge chamber continually disposed in communication with a predetermined minimum number of the flow paths, the predetermined number of the flow paths defining an adsorbent volume, the surge absorber having a surge absorber volume at least equal to the adsorbent volume.

9. The gas separation system according to claim 8, wherein the surge absorber volume is at least twice the adsorbent volume.

* * * * *